(12) United States Patent
Gan et al.

(10) Patent No.: US 6,265,106 B1
(45) Date of Patent: Jul. 24, 2001

(54) ALKALI METAL ELECTROCHEMICAL CELL ACTIVATED WITH A NONAQUEOUS ELECTROLYTE HAVING A SULFATE ADDITIVE

(75) Inventors: Hong Gan; Esther S. Takeuchi, both of East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/491,355

(22) Filed: Jan. 26, 2000

Related U.S. Application Data

(63) Continuation-in-part of application No. 09/460,035, filed on Dec. 13, 1999, now Pat. No. 6,180,283, which is a continuation-in-part of application No. 09/009,557, filed on Jan. 20, 1998, now Pat. No. 6,013,394.

(51) Int. Cl.[7] .................................................. H01M 4/60
(52) U.S. Cl. ........................ 429/215; 429/219; 429/220; 429/205; 429/231.5; 429/231.95; 429/325; 429/328; 429/330; 429/332; 429/333; 429/335
(58) Field of Search ..................................... 429/215, 219, 429/220, 205, 231.5, 231.95, 325, 328, 330, 332, 333, 335

(56) References Cited

U.S. PATENT DOCUMENTS

| | | | |
|---|---|---|---|
| 3,567,515 | 3/1971 | Maricle et al. . | |
| 4,444,855 | 4/1984 | Blomgren et al. | 429/105 |
| 4,482,616 | 11/1984 | Connelly et al. | 429/101 |
| 4,489,144 | 12/1984 | Clark | 429/196 |
| 4,520,084 | 5/1985 | Tinker et al. | 429/101 |
| 4,612,265 | 9/1986 | Connelly et al. | 429/196 |
| 4,906,538 | 3/1990 | Toyosawa et al. | 429/197 |
| 4,957,833 | 9/1990 | Daifuku et al. | 429/332 |
| 5,472,810 | 12/1995 | Takeuchi et al. | 429/217 |

FOREIGN PATENT DOCUMENTS 09245833   9/1997   (JP) .

*Primary Examiner*—Laura Weiner
(74) *Attorney, Agent, or Firm*—Hodgson Russ LLP

(57) ABSTRACT

An alkali metal, solid cathode, non-aqueous electrochemical cell capable of delivering high current pulses, rapidly recovering its open circuit voltage and having high current capacity, is described. The stated benefits are realized by the addition of at least one organic sulfate additive to an electrolyte comprising an alkali metal salt dissolved in a mixture of a low viscosity solvent and a high permittivity solvent. A preferred solvent mixture includes propylene carbonate, dimethoxyethane and a sulfate additive.

26 Claims, 4 Drawing Sheets

ALKALI METAL ELECTROCHEMICAL CELL ACTIVATED WITH A NONAQUEOUS ELECTROLYTE HAVING A SULFATE ADDITIVE

This application is a continuation-in-part of application Ser. No. 09/460,035, filed Dec. 13, 1999, now U.S. Pat. No. 6,180,285 which is a continuation in part of application Ser. No. 09/009,557, filed Jan. 20, 1998, now U.S. Pat. No. 6,013,394.

BACKGROUND OF INVENTION

1. Field of the Invention

The present invention generally relates to an alkali metal electrochemical cell, and more particularly, to an alkali metal cell suitable for current pulse discharge applications with reduced or no appreciable voltage delay. Still more particularly, the present invention relates to a lithium electrochemical cell activated with a non-aqueous electrolyte provided with an additive for the purpose of reducing and/or eliminating voltage delay under current pulse discharge applications. Voltage delay is a phenomenon typically exhibited in an alkali metal/transition metal oxide cell, and particularly, a lithium/silver vanadium oxide cell, that has been depleted of 40% to 70% of its capacity and is subjected to current pulse discharge applications.

2. Prior Art

The voltage response of a cell which does not exhibit voltage delay during the application of a short duration pulse or pulse train has distinct features. First, the cell potential decreases throughout the application of the pulse until it reaches a minimum at the end of the pulse, and second, the minimum potential of the first pulse in a series of pulses is higher than the minimum potential of the last pulse. FIG. 1 is a graph showing an illustrative discharge curve 10 as a typical or "ideal" response of a cell during the application of a series of pulses as a pulse train that does not exhibit voltage delay.

On the other hand, the voltage response of a cell which exhibits voltage delay during the application of a short duration pulse or during a pulse train can take one or both of two forms. One form is that the leading edge potential of the first pulse is lower than the end edge potential of the first pulse. In other words, the voltage of the cell at the instant the first pulse is applied is lower than the voltage of the cell immediately before the first pulse is removed. The second form of voltage delay is that the minimum potential of the first pulse is lower than the minimum potential of the last pulse when a series of pulses have been applied. FIG. 2 is a graph showing an illustrative discharge curve 12 as the voltage response of a cell that exhibits both forms of voltage delay.

The initial drop in cell potential during the application of a short duration pulse reflects the resistance of the cell, i.e., the resistance due to the cathode, the cathode-electrolyte interphase, the anode, and the anode-electrolyte interphase. In the absence of voltage delay, the resistance due to passivated films on the anode and/or cathode is negligible. However, the formation of a surface film is unavoidable for alkali metal, and in particular, lithium metal anodes, and for lithium intercalated carbon anodes, due to their relatively low potential and high reactivity towards organic electrolytes. Thus, the ideal anode surface film should be electrically insulating and ionically conducting. While most alkali metal, and in particular, lithium electrochemical systems meet the first requirement, the second requirement is difficult to achieve. In the event of voltage delay, the resistance of these films is not negligible, and as a result, impedance builds up inside the cell due to this surface layer formation which often results in reduced discharge voltage and reduced cell capacity. In other words, the drop in potential between the background voltage and the lowest voltage under pulse discharge conditions, excluding voltage delay, is an indication of the conductivity of the cell, i.e., the conductivity of the cathode, anode, electrolyte, and surface films, while the gradual decrease in cell potential during the application of the pulse train is due to the polarization of the electrodes and electrolyte.

Thus, the existence of voltage delay is an undesirable characteristic of alkali metal/mixed metal oxide cells subjected to current pulse discharge conditions in terms of its influence on devices such as medical devices including implantable pacemakers and cardiac defibrillators. Voltage delay is undesirable because it limits the effectiveness and even the proper functioning of both the cell and the associated electrically powered device under current pulse discharge conditions.

One of the known solutions to the above problem is to saturate the electrolyte solution with carbon dioxide $CO_2$. Cycling efficiency is improved dramatically in secondary cell systems having a lithium anode activated with $CO_2$ saturated electrolytes (V. R. Koch and S. B. Brummer, *Electrochimica Acta*, 1978, 23, 55–62; U.S. Pat. No. 4,853, 304 to Ebner et al.; D. Aurbach, Y. Gofer, M. Ben-Zion and P. Aped, *J. Electroanal. Chem.* 1992, 339, 451–471). U.S. Pat. No. 5,569,558 to Takeuchi et al. relates to the provision of a $CO_2$ saturated electrolyte for alleviating the presence of voltage delay in primary cells having a mixed transition metal oxide cathode such as lithium/silver vanadium oxide cells. The same effect is also known for lithium intercalated carbon anode secondary batteries (D. Aurbach, Y. Ein-Eli, O. Chusid, Y. Carmeli, M. Babai and H. Yamin, *J. Electrochem. Soc.* 1994, 141, 603–611). Sulfur dioxide ($SO_2$) has also been reported to be another additive that improves charge-discharge cycling in rechargeable lithium ion cells (Y. Ein-Eli, S. R. Thomas and V. R. Koch, *J. Electrochem. Soc.* 1996, 143, L195–L197).

In spite of the success of $CO_2$ and $S_2$ in improving cell discharge characteristics, their use has been limited. One problem associated with both $CO_2$ and $SO_2$ as electrolyte additives is that they are in a gaseous state at room temperature, and are thus difficult to handle. Also, it is difficult to control the dissolved concentration of $CO_2$. Best results are achieved at pressures of up to 50 psig., which further detracts from the practicality of this additive.

Instead of carbon dioxide and sulfur dioxide, the present invention is directed to the provision of organic sulfate additives in the electrolyte of an alkali metal electrochemical cell to beneficially modify the anode surface film. The sulfate additives are preferably organic alkyl sulfate compounds provided as a co-solvent with commonly used organic aprotic solvents. The organic sulfate additives are in a condensed phase which makes them easy to handle in electrolyte preparation. When used as a co-solvent in an activating electrolyte, the sulfate additives interact with the alkali metal anode to form an ionically conductive surface protective layer thereon. The conductive surface layer improves the discharge performance of the alkali metal electrochemical cell and minimizes or even eliminates voltage delay in the high current pulse discharge of such cells.

SUMMARY OF THE INVENTION

The object of the present invention is to improve the pulse discharge performance of an alkali metal electrochemical cell, and more particularly a primary lithium electrochemical cell, by the provision of at least one of a family of sulfate additives, preferably an alkyl sulfate additive, as a co-solvent in the cell's activating non-aqueous electrolyte solution. Due to the high reduction potentials of the sulfate group vs. lithium, alkyl sulfate additives can compete effectively with the other electrolyte co-solvents or the solute to react with the lithium anode. Lithium sulfate or the lithium salt of sulfate reduction products are believed to be the major reaction products. These lithium salts are believed to deposit on the anode surface to form an ionically conductive protective film thereon. As a consequence, the chemical composition and perhaps the morphology of the anode surface protective layer is changed, and this proves beneficial to the discharge characteristics of the cell.

The thusly fabricated cell exhibits reduced or no appreciable voltage delay under current pulse discharge usage, which is an unexpected result. More particularly, the present invention is directed to the introduction of at least one sulfate additive into the electrolyte of an alkali metal electrochemical cell having a cathode active material as a reaction product of silver and vanadium for the purpose of reducing and/or eliminating voltage delay during pulse discharging applications. Such alkali metal/transition metal oxide electrochemical systems are typically activated with an electrolyte comprising a relatively low viscosity solvent and a relatively high permittivity solvent. The solute of the electrolyte is an inorganic alkali metal salt wherein the alkali metal of the salt is the same as the alkali metal of the anode. The sulfate compound of the present invention is introduced into the electrolyte as an additive to interact with the alkali metal anode, and particularly with the lithium anode, to form an ionically conductive protective anode surface layer which improves the discharge performance of the cell, and minimizes or even eliminates voltage delay in current pulse discharge conditions. Therefore, the present invention is directed to a novel electrolyte solution provided in operative association with an electrochemical system incorporated into a defibrillator battery to minimize or even eliminate voltage delay under high current pulse discharge conditions.

These and other objects of the present invention will become increasingly more apparent to those skilled in the art by reference to the following description and to the appended drawings.

DETAILED DESCRIPTION OF THE PREFERRED EMBODIMENTS

Figure 1:
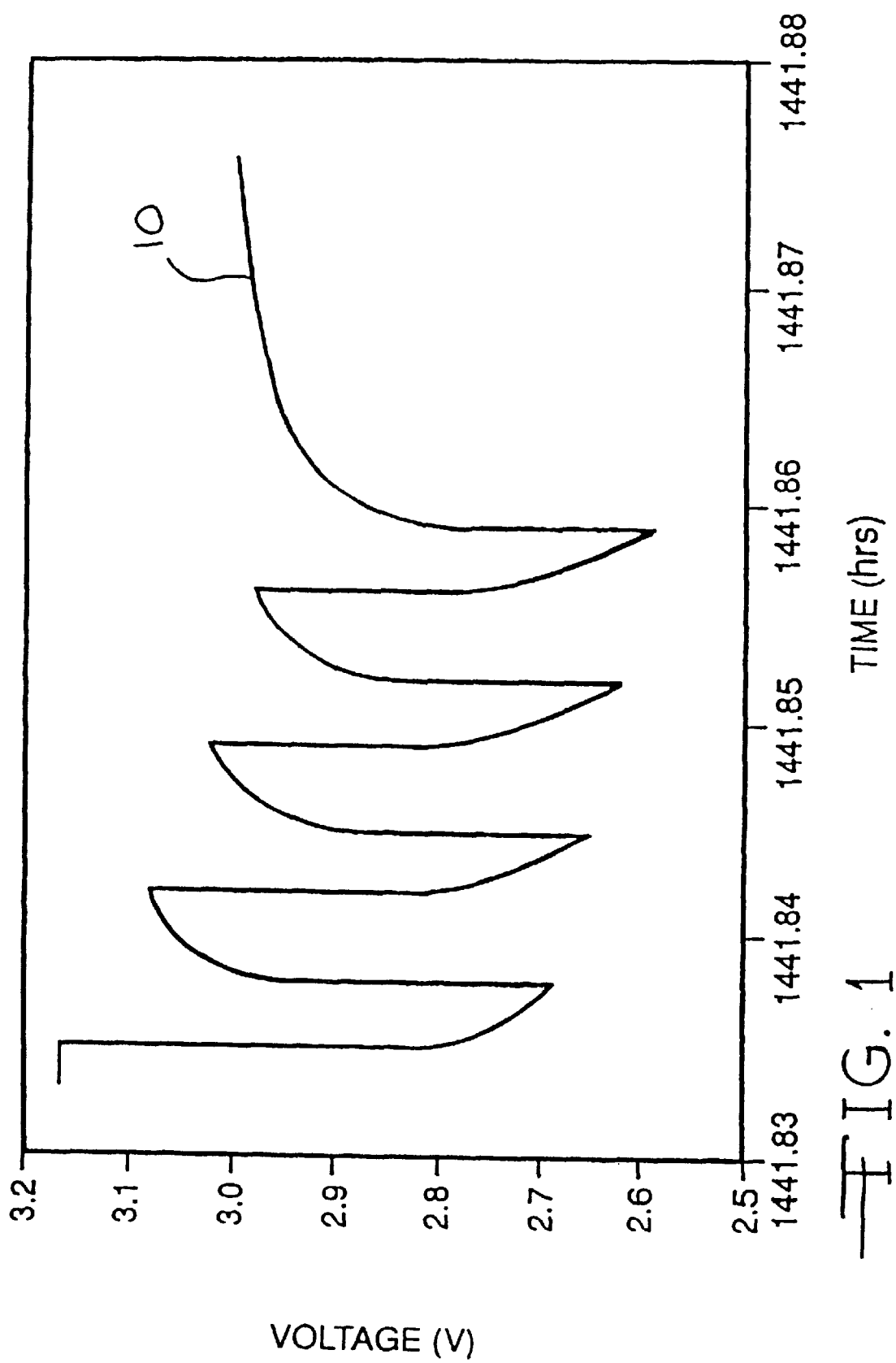
FIG. 1 is a graph showing an illustrative pulse discharge curve 10 of an exemplary electrochemical cell that does not exhibit voltage delay.
Figure 2:
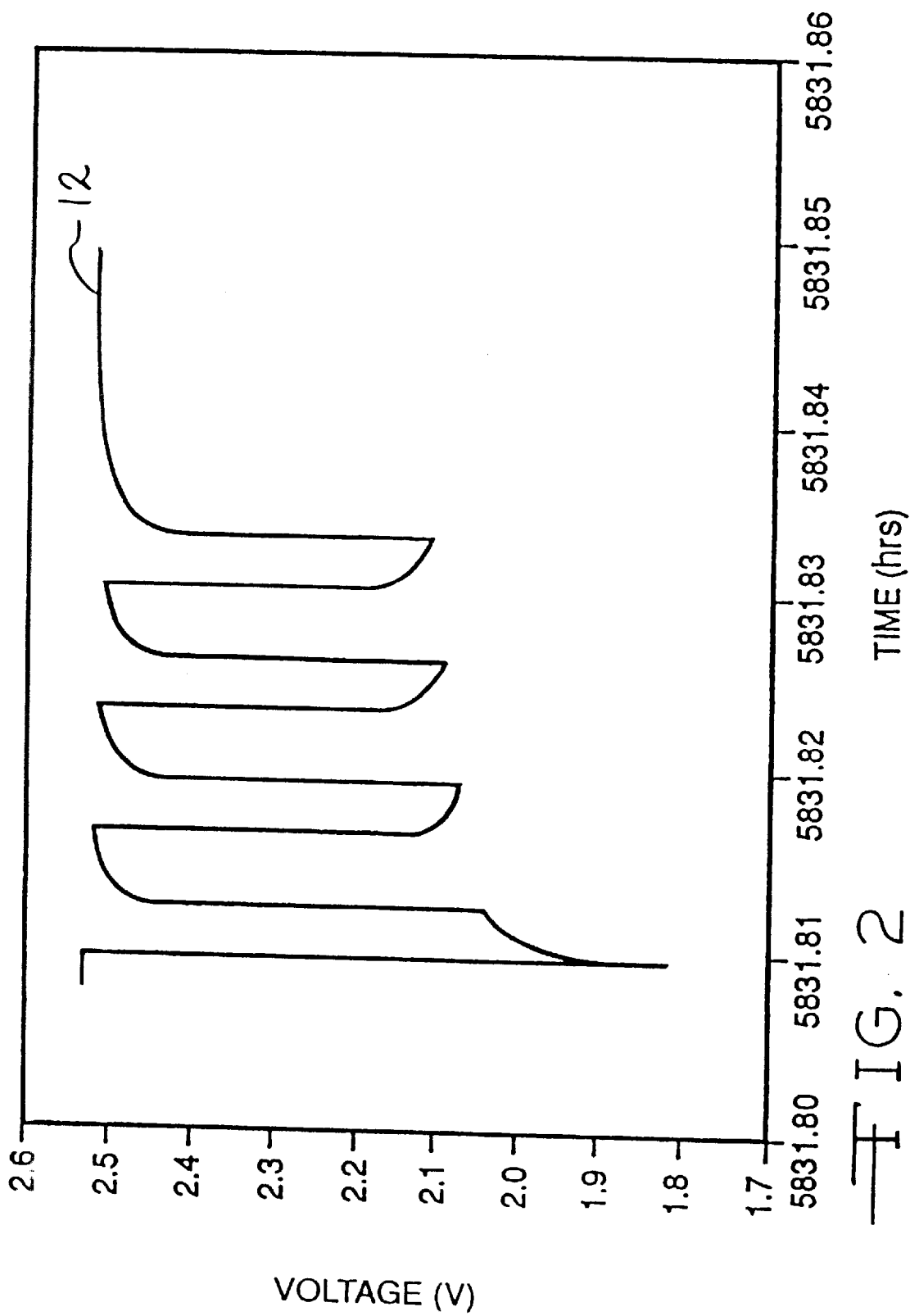
FIG. 2 is a graph showing an illustrative pulse discharge curve 12 of an exemplary electrochemical cell that exhibits voltage delay.

As used herein, the term "pulse" means a short burst of electrical current of a significantly greater amplitude than that of a pre-pulse current immediately prior to the pulse. A pulse train consists of at least two pulses of electrical current delivered in relatively short succession with or without open circuit rest between the pulses. Voltage delay is calculated as the pulse end potential minus the pulse minimum potential.

The electrochemical cell of the present invention includes an anode selected from Group IA, IIA or IIIB of the Periodic Table of Elements, including lithium, sodium, potassium, etc., and their alloys and intermetallic compounds including, for example Li—Si, Li—B and Li—Si—B alloys and intermetallic compounds. The preferred anode comprises lithium, and the more preferred anode comprises a lithium alloy, the preferred lithium alloy being a lithium-aluminum alloy. The greater the amount of aluminum present by weight in the alloy, however, the lower the energy density of the cell.

The form of the anode may vary, but preferably the anode is a thin metal sheet or foil of the anode metal, pressed or rolled on a metallic anode current collector, i.e., preferably comprising nickel, to form an anode component. In the exemplary cell of the present invention, the anode component has an extended tab or lead of the same material as the anode current collector, i.e., preferably nickel, integrally formed therewith such as by welding and contacted by a weld to a cell case of conductive metal in a case-negative electrical configuration. Alternatively, the anode may be formed in some other geometry, such as a bobbin shape, cylinder or pellet to allow an alternate low surface cell design.

The cathode is preferably of a solid material and the electrochemical reaction at the cathode involves conversion of ions which migrate from the anode to the cathode in atomic or molecular forms. The solid cathode material may comprise a metal, a metal oxide, a mixed metal oxide, a metal sulfide or a carbonaceous compound, and combinations thereof. The metal oxide, the mixed metal oxide and the metal sulfide can be formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which includes the noble metals and/or other oxide and sulfide compounds.

One preferred mixed metal oxide has the general formula $SM_XV_2O_Y$ wherein SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide (SVO) having the general formula $Ag_xV_2O_Y$ in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such a cathode active material reference is made to U.S. Pat. No. 4,310,609 to Liang et al., which is assigned to the assignee of the present invention and incorporated herein by reference.

Another preferred composite cathode active material includes $V_2O_Z$ wherein $z \leq 5$ combined with $Ag_2O$ with the silver in either the silver (II), silver (I) or silver (O) oxidation state and CuO with the copper in either the copper(II), copper(I) or copper (O) oxidation state to provide the mixed metal oxide having the general formula $Cu_xAg_yV_2O_z$, (CSVO). Thus, this composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq x \leq 1.0$, about $0.01 \leq y \leq 1.0$ and about $5.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material reference is made to U.S. Pat. Nos. 5,472,810 to Takeuchi et al. and U.S. Pat. No. 5,516,340 to Takeuchi et al., both of which are assigned to the assignee of the present invention and incorporated herein by reference.

Additional cathode active materials include manganese dioxide, lithium cobalt oxide, lithium nickel oxide, copper vanadium oxide, vanadium oxide, titanium disulfide, copper oxide, copper sulfide, iron sulfide, iron disulfide, and fluorinated carbon, and mixtures thereof. Preferably, the cathode comprises from about 80 to about 99 weight percent of the cathode active material.

Cathode active materials prepared as described above are preferably mixed with a binder material such as a powdered fluoro-polymer, more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material. The cathode active mixture may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include woven and non-woven fabrics of polyolefinic fibers or fluoropolymeric fibers including polyvinylidene fluoride, polyethylenetetrafluoro-ethylene, and polyethylenechlorotrifluoroethylene laminated or superposed with a polyolefinic or a fluoropolymeric microporous film. Suitable microporous films include a polytetrafluoro-ethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet which is placed between the anode and cathode electrodes and in a manner preventing physical contact there between. Such is the case when the anode is folded in a serpentine-like structure with a plurality of cathode plates disposed intermediate the anode folds and received in a cell casing or when the electrode combination is rolled or otherwise formed into a cylindrical "jellyroll" configuration.

The electrochemical cell of the present invention further includes a non-aqueous, ionically conductive electrolyte operatively associated with the anode and the cathode electrodes. The electrolyte serves as a medium for migration of ions between the anode and the cathode during the electrochemical reactions of the cell and non-aqueous solvents suitable for the present invention are chosen so as to exhibit those physical properties necessary for ionic transport (low viscosity, low surface tension and wettability). Suitable non-aqueous solvents are comprised of an inorganic salt dissolved in a non-aqueous solvent and more preferably an alkali metal salt dissolved in a mixture of aprotic organic solvents comprising a low viscosity solvent including organic esters, ethers and trialkyl carbonates, and mixtures thereof, and a high permittivity solvent including cyclic carbonates, cyclic esters and cyclic amides, and mixtures thereof. Low viscosity solvents include tetrahydrofuran (THF), methyl acetate (MA), diglyme, triglyme, tetraglyme, 1,2-dimethoxyethane (DME), dimethyl carbonate (DMC), diisopropylether, 1,2-diethoxyethane, 1-ethoxy,2-methoxyethane, diethyl carbonate (DEC), dipropyl carbonate (DPC), ethyl methyl carbonate (EMC), methyl propyl carbonate (MPC) and ethyl propyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL) and N-methyl-pyrrolidinone (NMP), and mixtures thereof.

The preferred electrolyte comprises an inorganic alkali metal salt, and in the case of an anode comprising lithium, the alkali metal salt of the electrolyte is a lithium based salt. Known lithium salts that are useful as a vehicle for transport of alkali metal ions from the anode to the cathode include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiO_2$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof. Suitable salt concentrations typically range between about 0.8 to 1.5 molar, and a preferred electrolyte for a lithium/transition metal oxide electrochemical cell includes $LiAsF_6$ or $LiPF_6$ dissolved in a 50:50 mixture, by volume, of PC and DME.

A distinguishing characteristic of a primary lithium metal cell, in comparison to that of a secondary lithium ion cell, is that the lithium anode material is consumed during discharge. In other words, the surface of the anode is shrinking or fading away from the electrode/electrolyte interphase during discharge. This is especially the case during high current pulse discharge when the anode surface passivation film breaks up to expose a fresh lithium surface. At this stage, a new passivation film forms and its chemical composition and surface morphology depends on the competition reactions of the existing components in the electrolyte, which, in turn, depends on the cell depth of discharge.

In a lithium/silver vanadium oxide cell, there are two characteristic voltage plateaus in the discharge profile. The first one occurs at about 3.2V and the second plateau occurs at about 2.6V. At the 3.2V discharge plateau, Li/SVO cells are known to be relatively stable and exhibit consistent long term pulse discharge behavior. This indicates that the lithium anode is effectively passivated by the electrolyte. However, when the cell is discharged to the 2.6V plateau, voltage delay is present in long term pulse discharge tests.

It has been determined that voltage delay in an alkali metal/transition metal oxide cell is caused by the growth of anode surface impedance. The chemical composition and the passivation ability of the anode surface layer have changed in the time that the Li/SVO cell has discharged from the 3.2V plateau to the 2.6V plateau. The reason for this is that silver vanadium oxide cathode material becomes more soluble in the electrolyte at the 2.6V plateau. The dissolved vanadium ions are then reduced on the anode surface and the deposited vanadium reduction product further catalyzes the decomposition of the electrolyte solute. In the case of the standard electrolyte comprising 1.0M LiAsF$_6$ dissolved in a 50:50 mixture, by volume, of propylene carbonate and 1,2-dimethoxyethane, the catalytic effect of the vanadium reduction product hastens the deposition of an arsenate reduction compound on the anode surface. Consequently, the anode surface impedance increases over time and results in voltage delay during high current pulse discharge in long term tests. The vanadium reduction product and the arsenate reduction product constitute an undesirable or "bad" film on the anode at the 2.6V plateau.

Consequently, in the absence of a sulfate additive to the electrolyte according to the present invention, the anode surface passivation film that reforms on the newly exposed fresh lithium surface during discharge contains vanadium compounds such that the anode passivation layer becomes more resistive tonically, or does not effectively passivate the anode electrically, and therefore, additional amounts of electrolyte decomposition occur on the anode surface. In turn, the impedance of the anode passivation layer increases over long term discharge tests, which results in unacceptable voltage delay and decreased pulse minimum potentials over those experienced without the undesirable anode surface passivation film. This is the reason for voltage delay during high current pulse discharge, especially in long term tests when the cell has been depleted of 40% to 70% of its capacity.

According to the present invention, the undesirable or "bad" passivation film formed on the lithium anode at the 2.6V depth of discharge in a Li/SVO cell is prevented by the presence of an electrically insulating and ionically conductive or "good" passivation layer formed on the anode surface. This passivation layer does not break up, or does not break up easily, during high current pulse discharge. If the passivation film does break up, it is readily reformed before an undesirable passivation layer replaces it. Thus, it is believed that the exposure of fresh lithium is prevented or minimized during discharge, with the result that the formation of a "bad" surface film formation between lithium and vanadium ion at the 2.6V plateau is prevented or at least greatly minimized. In a broader sense, however, the presence of an undesirable surface film on the lithium anode is possible in any cathode chemistry having a vanadium-containing constituent such as copper silver vanadium oxide, copper vanadium oxide and vanadium oxide active materials.

An electrically insulating and ionically conducting or "good" passivation layer is formed on the lithium anode in accordance with the present invention by the provision of at least one organic sulfate additive as a co-solvent in the electrolyte solution of the previously described alkali metal electrochemical cell. The sulfate additive is preferably a compound having the general formula $R^1OS(=O)_2(OR^2)$, and is selected from the group consisting of a silyl sulfate, a tin sulfate and an organic sulfate having at least one unsaturated hydrocarbon containing a $C(sp^2$ or $Sp^3)$—C$(sp^3)$ bond unit having the $C(sp^3)$ carbon directly connected to the —OSO$_3$— functional group. In the general formula $R^1$ and $R^2$ are the same or different, and they can both be a hydrogen atom or an organic group containing 1 to 12 carbon atoms, and wherein at least $R^1$ has the structure $(R^3)(R^4)(R^5)C$— if $R^2 \neq H$ with at least $R^3$ being an aromatic substituent or an unsaturated organic or inorganic group and wherein if any of the remaining groups of $R^4$ and $R^5$ is a saturated organic group, the saturated organic group contains 1 to 11 carbon atoms. The greatest effect is found when diallyl sulfate, methyl benzyl sulfate, ethyl benzyl sulfate, propyl benzyl sulfate, butyl benzyl sulfate, pentyl benzyl sulfate, methyl allyl sulfate, ethyl allyl sulfate, propyl allyl sulfate, butyl allyl sulfate, pentyl allyl sulfate, mono-methyl sulfate, mono-ethyl sulfate, mono-butyl sulfate, mono-propyl sulfate, mono-pentyl sulfate, mono-allyl sulfate, mono-benzyl sulfate, dibenzyl sulfate, mono-trimethyltin sulfate, mono-triethyltin sulfate, mono-tripropyltin sulfate, mono-tributyltin sulfate, mono-tripentyltin sulfate, bis(trimethyltin) sulfate, bis(triethyltin) sulfate, bis(tripropyltin) sulfate, bis(tributyltin) sulfate, bis(tripentyltin) sulfate, mono-trimethylsilyl sulfate, mono-triethylsilyl sulfate, mono-tripropylsilyl sulfate, mono-tributylsilyl sulfate, mono-tripentylsilyl sulfate, bis(trimethylsilyl) sulfate, bis(triethylsilyl) sulfate, bis(tripropylsilyl) sulfate, bis(tributylsilyl) sulfate and bis(tripentylsilyl) sulfate and mixtures thereof.

The above described compounds are only intended to be exemplary of those that are useful with the present invention, and are not to be construed as limiting. Those skilled in the art will readily recognize sulfate compounds which come under the purview of the general formula set forth above and which will be useful as additives for the electrolyte to reduce voltage delay according to the present invention.

While not intending to be bound by any particular mechanism, it is believed that due to the presence of the —OSO$_3$— functional group, the bond between oxygen and at least one of the group $R^1$ and $R^2$ is severed and the sulfate intermediate is able to compete effectively with the other electrolyte solvents or solutes to react with lithium and form a sulfate salt, i.e., lithium sulfate, or the lithium salt of a sulfate reduction product on the surface of the anode. The resulting salt is more conductive than lithium oxide which may form on the anode in the absence of the organic sulfate additive. In fact, it is believed that the lithium sulfate or the lithium salt of a sulfate reduction product on the surface of the anode provides for the existence of charge delocalization due to resonance equilibration at the anode surface. This equilibration allows lithium ions to travel easily from one molecule to the other via a lithium ion exchange mechanism. As a result, beneficial ionic conductance is realized.

During discharge, the lithium metal electrode is shrinking while the surface film moves continuously toward the lithium metal surface by following the lithium ion exchange mechanism. This process prevents the break up of the surface film and avoids the exposure of fresh lithium metal to the electrolyte. As a result, voltage delay in a lithium anode/transition metal oxide cell is minimized and even eliminated using electrolytes containing sulfate additives according to the present invention. As a consequence, the chemical composition and perhaps the morphology of the anode surface protective layer is believed to be changed with concomitant benefits to the cell's discharge characteristics.

In the present invention, the anode is lithium metal and the cathode is preferably the transition mixed metal oxide $AgV_2O_{5.5}$ (SVO). The preferred electrolyte is 1.0M to 1.2M $LiAsF_6$ dissolved in an aprotic solvent mixture comprising at least one of the above listed low viscosity solvents and at least one of the above listed high permittivity solvents. The preferred aprotic solvent mixture comprises a 50/50, by volume, mixture of propylene carbonate and dimethoxyethane. The concentration of the above discussed sulfate additives according to the present invention should preferably be in the range of between about 0.001M to about 0.20M. The positive effects of these additives in reducing voltage delay in a pulse discharging alkali metal cell have been achieved both at room temperature as well as at temperatures up to about 37° C. This makes the novel electrolyte solution of the present invention particularly useful for activating an alkali metal/transition metal oxide cell incorporated into an implantable medical device such as a cardiac defibrillator to minimize or even eliminate voltage delay under high current pulse discharge conditions.

As is well known by those skilled in the art, an implantable cardiac defibrillator is a device that requires a power source for a generally medium rate, constant resistance load component provided by circuits performing such functions as, for example, the heart sensing and pacing functions. From time to time, the cardiac defibrillator may require a generally high rate, pulse discharge load component that occurs, for example, during charging of a capacitor in the defibrillator for the purpose of delivering an electrical shock to the heart to treat tachyarrhythmias, the irregular, rapid heartbeats that can be fatal if left uncorrected. Reduction and even elimination of voltage delay during a current pulse application is important for proper device operation and extended device life.

The assembly of the cell described herein is preferably in the form of a wound element cell. That is, the fabricated cathode, anode and separator are wound together in a "jellyroll" type configuration or "wound element cell stack" such that the anode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23 or FUSITE 425 or FUSITE 435. The positive terminal pin feedthrough preferably comprises titanium although molybdenum, aluminum, nickel alloy, or stainless steel can also be used. The cell header comprises elements having compatibility with the other components of the electrochemical cell and is resistant to corrosion. The cathode lead is welded to the positive terminal pin in the glass-to-metal seal and the header is welded to the case containing the electrode stack. The cell is thereafter filled with the electrolyte solution comprising at least one of the sulfate additives described hereinabove and hermetically sealed such as by close-welding a stainless steel ball over the fill hole, but not limited thereto.

The above assembly describes a case-negative cell, which is the preferred construction of the exemplary cell of the present invention. As is well known to those skilled in the art, the exemplary electrochemical system of the present invention can also be constructed in a case-positive configuration.

The following examples describe the manner and process of an electrochemical cell according to the present invention, and set forth the best mode contemplated by the inventors of carrying out the invention, but are not construed as limiting.

EXAMPLE I

Lithium anode material was pressed on nickel current collector screen and silver vanadium oxide cathode material was pressed on titanium current collector screen. A prismatic cell stack assembly configuration with two layers of microporous membrane propylene separator sandwiched between the anode and cathode was prepared. The electrode assembly was then hermetically sealed in a stainless steel casing in a case-negative configuration. Three cells were activated with the standard electrolyte consisting of 1.0M $LiAsF_6$ dissolved in a 50:50, by volume, mixture of PC and DME without an organic sulfate additive (Group 1). Three cells were activated with the same electrolyte used to activate the Group 1 cells and further containing 0.01M of bis(trimethylsilyl) sulfate (BTMSS), as set forth in Table 1.

TABLE 1

| | Cell Construction | | |
|---|---|---|---|
| Group | [$LiAsF_6$] | PC:DME | [BTMSS] |
| 1 | 1.0M | 50:50 | 0.00M |
| 3 | 1.0M | 50:50 | 0.01M |

A constant resistive load of 3.57 kΩ was applied to all of the cells for 21 hours during an initial pre-discharge burn-in period. The pre-discharge burn-in period depleted the cells of approximately 1% of their theoretical capacity. Following burn-in, the cells were subjected to acceptance pulse testing consisting of four 10 second pulses (18.4 mA/cm$^2$) with a 15 second rest between each pulse. Then, the cells were further pre-discharged under a 200 Ω load to remove about 600 ma-hrs of capacity.

After pre-discharge, the cells were discharged under a load of 11 kΩ at 37° C. and a pulse train 1 consisting of four 10 second pulses (18.4 mA/cm$^2$) was immediately applied. The average discharge readings for the pre-pulse potentials and pulse 1 to 4 minimum potentials during pulse train 1 for the groups 1 and 2 cells are summarized in Table 2.

TABLE 2

| | Pulse Train 1 Voltages (average) | | | | |
|---|---|---|---|---|---|
| Group | Ppre1 | P1 min | P2 min | P3 min | P4 min |
| 1 | 2.573 | 2.297 | 2.265 | 2.244 | 2.227 |
| 2 | 2.569 | 2.272 | 2.239 | 2.214 | 2.196 |

The data in Table 2 clearly demonstrate that both groups of cells exhibited no voltage delay. Voltage delay is calculated as pulse 1 end potential minus pulse 1 minimum potential. Group 2 cells with the sulfate additive exhibited slightly lower pulse minimum potentials than that of the group 1 cells in all four pulses.

Figure 3:
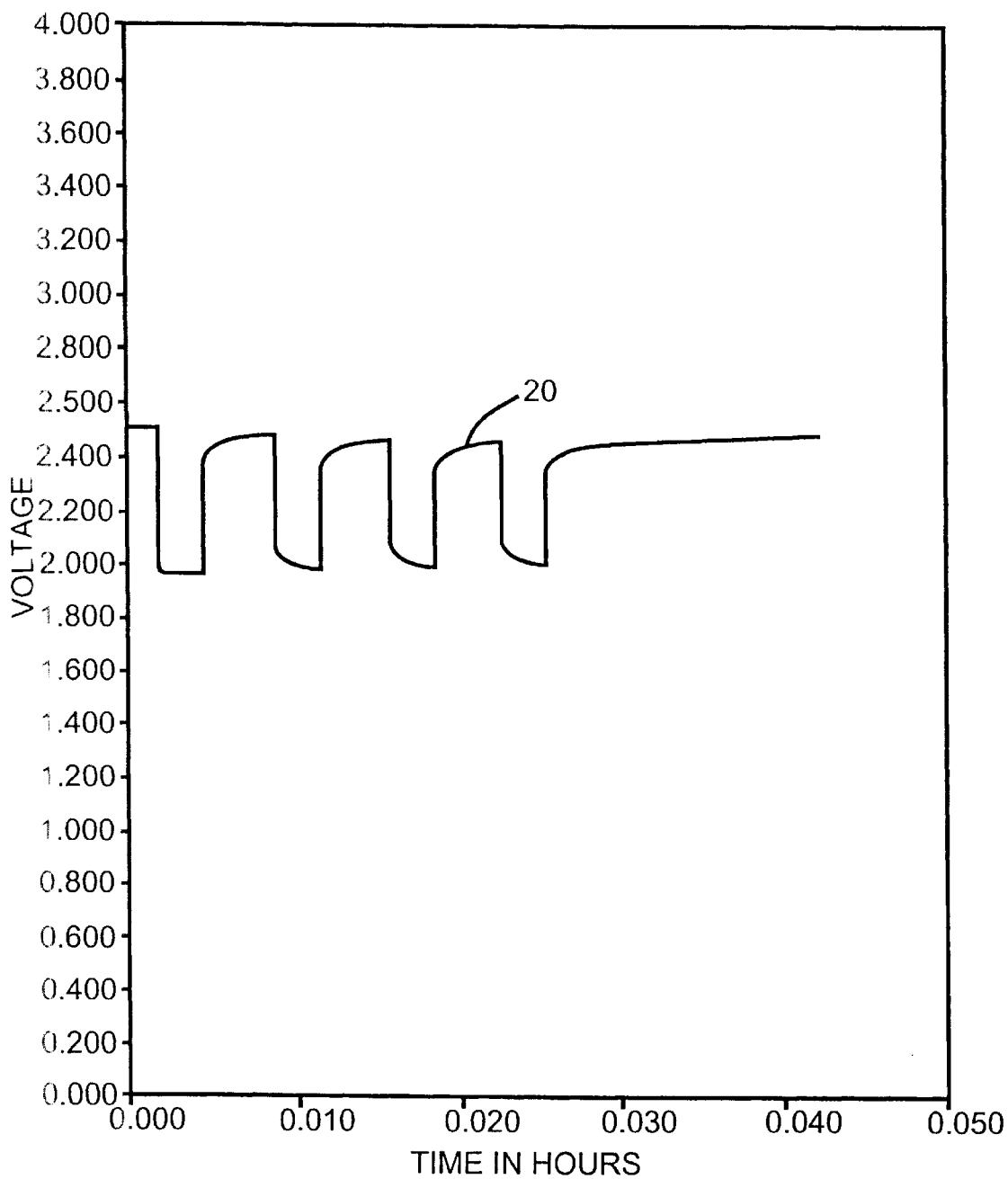
FIG. 3 is a graph showing the pulse discharge voltage curves of a lithium/silver vanadium oxide cell activated with an electrolyte devoid of a sulfate additive during the application of four 10 second pulses (23.2 mA/cm$^2$) with a 15 rest between each pulse.
Figure 4:
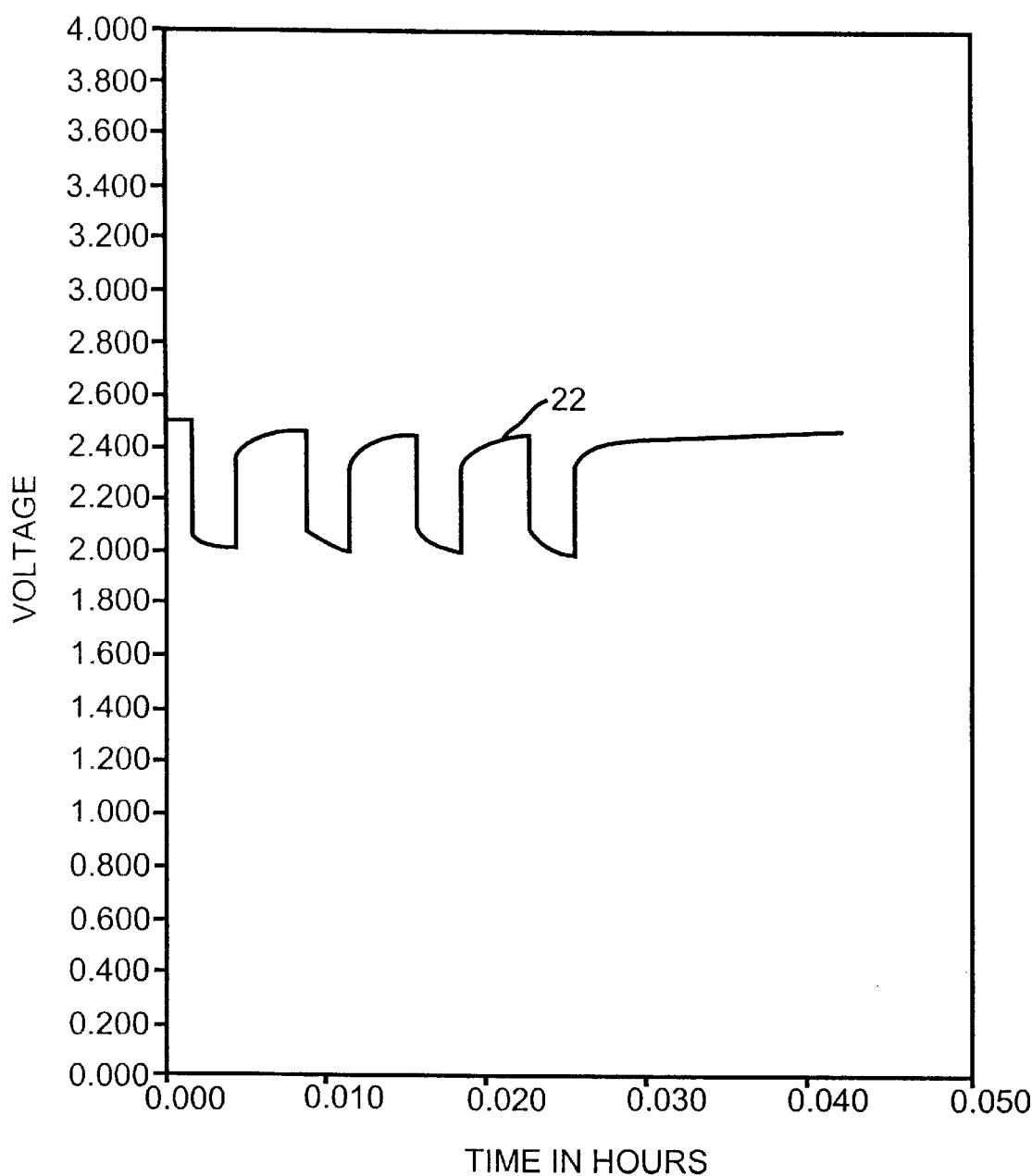
FIG. 4 is a graph showing the pulse discharge voltage curves of a lithium/silver vanadium oxide cell activated with an electrolyte having bis(trimethylsilyl) sulfate (BTMSS) dissolved therein during the application of a pulse train similar to that used to construct the graph of FIG. 3.

After 38 days of discharge on the 11 kΩ load, another pulse train (pulse train 2) was applied. The results are summarized in Table 3 and in FIGS. 3 and 4. FIG. 3 is a graph showing the pulse train of an exemplary one of the prior art group 1 cells wherein curve 20 was constructed from pulse train 2. FIG. 4 is a graph showing the pulse train of an exemplary one of the present invention group 2 cells wherein curve 22 was constructed from pulse train 2.

TABLE 3

Pulse Train 2 Voltages (average)

| Group | Ppre1 | P1 min | P2 min | P3 min | P4 min |
|---|---|---|---|---|---|
| 1 | 2.507 | 1.966 | 1.980 | 1.986 | 1.992 |
| 2 | 2.504 | 2.002 | 1.994 | 1.988 | 1.987 |

The data in Table 3 clearly demonstrate the sulfate additive effect. Both groups of cells presented similar pre-pulse potentials. However, for group 1 cells (without electrolyte additive) the pulse minimum potentials are in the order of:

P1min<P2min<P3min<P4min

While for group 2 cells (with 0.01M BTMSS additive) the pulse minimum potentials is in the order of:

P1min>P2min>P3min~P4min

The recovery of voltages (group 1 cells) after high current pulsing represent the existence of voltage delay due to the formation of an ionically less conductive anode surface passivation layer. In the presence of the dialkyl sulfate additive (group 2 cells), the anode passivation layer is chemically modified to be ionically more conductive. As a result, no voltage delay was observed.

Comparing the average pulse minimum potential of both groups of cells (subtracting the average pulse minimum potentials for the group 1 cells from the group 2 cells), the group 2 cells exhibited higher potentials in pulse 1 and pulse 2, and slightly lower potentials in pulse 4, as set forth in Table 4.

TABLE 4

Pulse Minimum Potentials Comparison

| Pulse | Group 1 − Group 2 |
|---|---|
| 1 | −0.036 V |
| 2 | −0.014 V |
| 3 | −0.002 V |
| 4 | +0.005 V |

While not intended to be bound by any particular theory, it is believed that the formation of $S(=O_2)(O-Li)_n(OR)_m$ wherein n=1 or 2 and m=0 or 1, or its reaction products, deposited on the anode surface is responsible for the improved performance of an alkali metal/transition metal oxide cell and, in particular, a Li/SVO cell. If the R group in the sulfate additive is hydrogen (acidic proton), it will react with lithium metal to form an O—Li bond directly. In addition, if one of the R groups is activated (benzyl for example), the O—R bond is relatively weak. During reduction, the O—R bond breaks to form a product containing the S—O—Li salt group. The sulfate intermediate is then able to compete effectively with the other electrolyte solvents or solutes to react with lithium and form a sulfate salt, i.e., lithium sulfate, or the lithium salt of a sulfate reduction product on the surface of the anode. The resulting sulfate salt is ionically more conductive than lithium oxide which may form on the anode in the absence of the organic sulfate additive. As a consequence, the chemical composition and perhaps the morphology of the anode surface protective layer is believed to be changed with concomitant benefits to the cell's discharge characteristics. This is believed to be the reason for the observed improvements in the lithium ion cells, as exemplified by those having the BTMSS additive.

The concentration limit is between about 0.001M to 0.40M. The beneficial effect of the alkyl sulfate will not be apparent if the additive concentration is less than about 0.001M. On the other hand, if the additive concentration is greater than about 0.40M, the beneficial effect of the additive will be cancelled by the detrimental effect of higher internal cell resistance due to the thicker anode surface film formation and lower electrolyte conductivity. For BTMSS, the concentration limit is about 0.02M.

Thus, the existence of voltage delay is due to the formation of an anode surface passivation layer that is ionically less conductive than either the anode material itself or the electrolyte solution. In the presence of an alkyl sulfate additive according to the present invention, the anode passivation layer is chemically modified to be tonically more conductive than the passivation layer formed without the benefit of the organic sulfate additive. It is believed that due to the presence of the —OSO$_3$— functional group, the reductive cleavage of at least one of the OR$^1$ and OR$^2$ bonds in the sulfate additives of the present invention may produce lithium sulfate or the lithium salt of a sulfate reduction product on the anode surface. This surface film is ionically more conductive than the film formed in the absence of the additives and it is believed responsible for the increased cell performance, especially during pulse discharge applications. As a consequence, diminished voltage delay results when an alkali metal/transition metal oxide couple activated with a nonaqueous organic solvent having a sulfate additive dissolved therein according to the present invention is subjected to a pulse discharge application.

It is appreciated that various modifications to the inventive concepts described herein may be apparent to those of ordinary skill in the art without departing from the spirit and scope of the present invention as defined by the appended claims.

What is claimed is:

1. An electrochemical cell, which comprises:
   a) an anode comprising an alkali metal;
   b) a cathode comprising a cathode active material; and
   c) a nonaqueous electrolyte activating the anode and the cathode, the nonaqueous electrolyte comprising:
      i) a sulfate additive having the general formula R$^1$OS(=O)$_2$(OR$^2$), and being selected from the group consisting of a silyl sulfate, a tin sulfate and an organic sulfate having at least one unsaturated hydrocarbon containing a C (sp$^2$ or sp$^3$) —C (sp$^3$) bond unit having the C(sp$^3$) carbon directly connected to the —OSO$_3$— functional group, wherein R$^1$ and R2 are the same or different and they can both be a hydrogen atom or an organic group containing 1 to 12 carbon atoms, and wherein at least R$^1$ has the structure (R$^3$) (R$^4$) (R$^5$) C— if R$^2 \neq$H with at least R$^3$ being an aromatic substituent or an unsaturated organic or inorganic group and wherein if any of the remaining groups of R$^4$ and R$^5$ is a saturated organic group, the saturated organic group contains 1 to 11 carbon atoms; and
      ii) an alkali metal salt dissolved therein.

2. The electrochemical cell of claim 1 including selecting the additive from the group consisting of diallyl sulfate, methyl benzyl sulfate, ethyl benzyl sulfate, propyl benzyl sulfate, butyl benzyl sulfate, pentyl benzyl sulfate, methyl allyl sulfate, pentyl allyl sulfate, mono-methyl sulfate, mono-ethyl sulfate, mono-butyl sulfate, mono-propyl sulfate, mono-pentyl sulfate, mono-allyl sulfate, mono-benzyl sulfate, dibenzyl sulfate, mono-trimethyltin sulfate, mono-triethyltin sulfate, mono-tripropyltin sulfate, mono-tributyltin sulfate, mono-tripentyltin sulfate, bis(trimethyltin) sulfate, bis(triethyltin) sulfate, bis(tripropyltin) sulfate, bis(tributyltin) sulfate, bis(tripentyltin) sulfate, mono-trimethylsilyl sulfate, mono-triethylsilyl sulfate, mono-tripropylsilyl sulfate, mono-tributylsilyl sulfate, mono-tripentylsilyl sulfate, bis(trimethylsilyl) sulfate, bis(triethylsilyl) sulfate, bis(tripropylsilyl) sulfate, bis(tributylsilyl) sulfate, bis(tripentylsilyl) sulfate, and mixtures thereof.

3. The electrochemical cell of claim 1 wherein the sulfate additive is present in the electrolyte in a range of about 0.001M to about 0.40M.

4. The electrochemical cell of claim 1 wherein the activated anode and cathode provide the electrochemical cell dischargeable to deliver at least one current pulse of an electrical current of an amplitude greater than that of a pre-pulse current immediately prior to the pulse such that the pulse one end potential minus the pulse one minimum potential is less than about 200 mV.

5. The electrochemical cell of claim 4 wherein there are at least two pulses delivered in succession with or without an open circuit period between the pulses.

6. The electrochemical cell of claim 5 wherein the current pulses are of about 23.2 mA/cm$^2$.

7. The electrochemical cell of claim 1 wherein the nonaqueous electrolyte comprises a first solvent selected from the group consisting of an ester, an ether, a dialkyl carbonate, and mixtures thereof, and a second solvent selected from the group consisting of a cyclic carbonate, a cyclic ester, a cyclic amide, and mixtures thereof.

8. The electrochemical cell of claim 7 wherein the first solvent is selected from the group consisting of tetrahydrofuran, methyl acetate, diglyme, triglyme, tetraglyme, 1,2-dimethoxyethane, diisopropylether, 1,2-diethoxyethane, 1-ethoxy, 2-methoxyethane, dimethyl carbonate, diethyl carbonate, ethyl methyl carbonate, methyl propyl carbonate, ethyl propyl carbonate, and mixtures thereof.

9. The electrochemical cell of claim 7 wherein the second solvent is selected from the group consisting of propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

10. The electrochemical cell of claim 7 wherein the alkali metal salt is selected from the group consisting of LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiO$_2$, LiN (SO$_2$CF$_3$)$_2$, LiSCN, LiO$_3$SCF$_2$CF$_3$, LiC$_6$F$_{SO3}$, LiO$_2$CCF$_3$, LiSO$_3$F, LiB (C$_6$H$_5$)$_4$, LiCF$_3$SO$_3$, and mixtures thereof.

11. The electrochemical cell of claim 1 wherein the cathode active material is selected from the group consisting of silver vanadium oxide, copper silver vanadium oxide, copper vanadium oxide, vanadium oxide, and mixtures thereof.

12. The electrochemical cell of claim 1 wherein the anode is comprised of lithium or a lithium-aluminum alloy.

13. The electrochemical cell of claim 1 wherein the cathode comprises from about 80 to about 99 weight percent of the cathode active material.

14. The electrochemical cell of claim 1 wherein the cathode further comprises a binder material and a conductive additive.

15. The electrochemical cell of claim 14 wherein the binder material is a fluoro-resin powder.

16. The electrochemical cell of claim 14 wherein the conductive additive is selected from the group consisting of carbon, graphite powder and acetylene black and metallic powder selected from the group consisting of titanium, aluminum, nickel, stainless steel, and mixtures thereof.

17. The electrochemical cell of claim 1 wherein the cathode comprises from about 0 to 3 weight percent carbon, about 1 to 5 weight percent of a powder fluoro-resin and about 94 weight percent of the cathode active material.

18. The electrochemical cell of claim 1 associated with an implantable medical device powered by the cell.

19. An electrochemical cell which is dischargeable to deliver a plurality of current pulses while exhibiting reduced voltage delay, the electrochemical cell comprising:
   a) an anode comprising an alkali metal;
   b) a cathode including a mixed metal oxide comprised of vanadium oxide and a second metal "SM" selected from the group consisting of Groups IB, IIB, IIIB, IVB, VB, VIB, VIIB and VIII of the Periodic table of the elements, the mixed metal oxide having the general formula SM$_x$V$_2$O$_y$ wherein $0.30 \leq x \leq 2.0$ and $4.5 \leq y \leq 6.0$; and
   c) a nonaqueous electrolyte activating the anode and the cathode, the nonaqueous electrolyte comprising:
      i) a first solvent selected from the group consisting of an ester, an ether, a dialkyl carbonate, and mixtures thereof;
      ii) a second solvent selected from the group consisting of a cyclic carbonate, a cyclic ester, a cyclic amide, and mixtures thereof;
      iii) a sulfate additive having the general formula R$^1$OS(=O)$_2$(OR$^2$), and being selected from the group consisting of a silyl sulfate, a tin sulfate and an organic sulfate having at least one unsaturated hydrocarbon containing a C (sp$^2$ or sp$^3$)— C (sp$^3$) bond unit having the C (sp$^3$) carbon directly connected to the —OSO— functional group, wherein R$^1$ and R$^2$ are the same or different and they can both be a hydrogen atom or an organic group containing 1 to 12 carbon atoms, and wherein at least R$^1$ has the structure (R$^3$) (R$^4$) (R$^5$) C— if R$^2 \neq$H with at least R$^3$ being an aromatic substituent or an unsaturated organic or inorganic group and wherein if any of the remaining groups of R$^4$ and R$^5$ is a saturated organic group, the saturated organic group contains 1 to 11 carbon atoms; and
      iv) an alkali metal salt dissolved therein, wherein the activated anode and cathode provide the electrochemical cell dischargeable to deliver at least one current pulse of a short duration burst of electrical current of a significantly greater amplitude than that of a pre-pulse current immediately prior to the pulse such that the pulse one end potential minus the pulse one minimum potential is less than about 200 mV.

20. The electrochemical cell of claim 19 wherein the current pulses are of about 23.2 mA/cm$^2$.

21. An electrochemical cell which is dischargeable to deliver a plurality of current pulses while exhibiting reduced voltage delay, the cell which comprises:
   a) an anode comprising an alkali metal;
   b) a cathode including a mixed metal oxide comprised of vanadium oxide and a mixture of copper and a second metal "SM" selected from the group consisting of Groups IB, IIB, IIIB, IVB, VB, VIB, VIIB and VIII of the Periodic Table of the Elements and copper oxide, the mixed metal oxide having the general formula $Cu_xSM_yV_2O_z$ wherein $0.01 \leq x \leq 1.0$, $0.01 \leq y \leq 1.0$ and $5.01 \leq z \leq 6.5$; and c) a nonaqueous electrolyte activating the anode and the cathode, the nonaqueous electrolyte comprising:
   i) a first solvent selected from the group consisting of an ester, an ether, a dialkyl carbonate, and mixtures thereof;
   ii) a second solvent selected from the group consisting of a cyclic carbonate, a cyclic ester, a cyclic amide, and mixtures thereof;
   iii) a sulfate additive having the general formula $R^1OS(=O)_2(OR^2)$, and being selected from the group consisting of a silyl sulfate, a tin sulfate and an organic sulfate having at least one unsaturated hydrocarbon containing a $C(sp^2$ or $sp^3)$— $C(sp^3)$ bond unit having the $C(sp^3)$ carbon directly connected to the —$OSO_3$— functional group, wherein $R^1$ and $R^2$ are the same or different and they can both be a hydrogen atom or an organic group containing 1 to 12 carbon atoms, and wherein at least $R^1$ has the structure $(R^3)(R^4)(R^5)C$— if $R^2 \neq H$ with at least $R^3$ being an aromatic substituent or an unsaturated organic or inorganic group and wherein if any of the remaining groups of $R^1$ and $R^5$ is a saturated organic group, the saturated organic group contains 1 to 11 carbon atoms; and
   iv) an alkali metal salt dissolved therein, wherein the activated anode and cathode provide the electrochemical cell dischargeable to deliver at least one current pulse of a short duration burst of electrical current of a significantly greater amplitude than that of a pre-pulse current immediately prior to the pulse such that the pulse one end potential minus the pulse one minimum potential is less than about 200 mV.

22. The electrochemical cell of claim 21 wherein the current pulses are of about 23.2 mA/cm$^2$.

23. In combination with an implantable medical device requiring at least one current pulse for a medical device operating function, an electrochemical cell which is dischargeable to deliver the current pulse while exhibiting reduced voltage delay, the cell which comprises:
   a) an anode comprising an alkali metal;
   b) a solid cathode of electrically conductive material; and
   c) a nonaqueous electrolyte activating the anode and the cathode, the nonaqueous electrolyte comprising:
      i) a first solvent selected from the group consisting of an ester, an ether, a dialkyl carbonate, and mixtures thereof;
      ii) a second solvent selected from the group consisting of a cyclic carbonate, a cyclic ester, a cyclic amide, and mixtures thereof;
      iii) a sulfate additive having the general formula $R^1OS(=O)_2(OR^2)$, and being selected from the group consisting of a silyl sulfate, a tin sulfate and an organic sulfate having at least one unsaturated hydrocarbon containing a $C(sp^2$ or $sp^3)$— $C(sp^3)$ bond unit having the $C(sp^3)$ carbon directly connected to the —$OSO_3$— functional group, wherein $R^1$ and $R^2$ are the same or different and they can both be a hydrogen atom or an organic group containing 1 to 12 carbon atoms, and wherein at least $R^1$ has the structure $(R^3)(R^4)(R^5)C$— if $R^2 \neq H$ with at least $R^3$ being an aromatic substituent or an unsaturated organic or inorganic group and wherein if any of the remaining groups of $R^4$ and $R^5$ is a saturated organic group, the saturated organic group contains 1 to 11 carbon atoms; and
      iv) an alkali metal salt dissolved therein, wherein the activated anode and cathode provide the electrochemical cell dischargeable to deliver at least one current pulse for the medical device operating function, and wherein the current pulse is of a short duration burst of electrical current of a significantly greater amplitude than that of a prepulse current immediately prior to the pulse such that the pulse one end potential minus the pulse one minimum potential is less than about 200 mV.

24. The combination of claim 23 including selecting the additive from the group consisting of diallyl sulfate, methyl benzyl sulfate, ethyl benzyl sulfate, propyl benzyl sulfate, butyl benzyl sulfate, pentyl benzyl sulfate, methyl allyl sulfate, ethyl allyl sulfate, propyl allyl sulfate, butyl allyl sulfate, pentyl allyl sulfate, mono-methyl sulfate, mono-ethyl sulfate, mono-butyl sulfate, mono-propyl sulfate, mono-pentyl sulfate, mono-allyl sulfate, mono-benzyl sulfate, dibenzyl sulfate, mono-trimethyltin sulfate, mono-triethyltin sulfate, mono-tripropyltin sulfate, mono-tributyltin sulfate, mono-tripentyltin sulfate, bis(trimethyltin) sulfate, bis(triethyltin) sulfate, bis(tripropyltin) sulfate, bis(tributyltin) sulfate, bis(tripentyltin) sulfate, mono-trimethylsilyl sulfate, mono-triethylsilyl sulfate, mono-tripropylsilyl sulfate, mono-tributylsilyl sulfate, mono-tripentylsilyl sulfate, bis(trimethylsilyl) sulfate, bis(triethylsilyl) sulfate, bis(tripropylsilyl) sulfate, bis(tributylsilyl) sulfate, bis(tripentylsilyl) sulfate, and mixtures thereof.

25. The combination of claim 23 wherein the sulfate additive is present in the electrolyte in a range of about 0.001M to about 0.40M.

26. The combination of claim 23 wherein there are at least two pulses delivered in succession with or without an open circuit period between the pulses.

* * * * *

UNITED STATES PATENT AND TRADEMARK OFFICE
CERTIFICATE OF CORRECTION

PATENT NO. : 6,265,106 B1
DATED : July 24, 2001
INVENTOR(S) : Gan et al.

Page 1 of 1

It is certified that error appears in the above-identified patent and that said Letters Patent is hereby corrected as shown below:

Column 2,
Line 41, "S$_2$" should be -- SO$_2$ --.

Column 6,
Line 47, "LiC (SO$_2$CF$_3$)$_3$" should be -- LiC(SO$_2$CF$_3$)$_3$ --; and "LiN (SO$_2$CF$_3$)$_2$" should be -- LiN(SO$_2$CF$_3$)$_2$ --.

Column 7,
Line 34, "tonically" should be -- ionically --.

Column 12,
Line 56, "R2" should be -- R$^2$ --.

Column 13,
Line 42, "1-ethoxy, 2-methoxyethane" should be -- 1-ethoxy, 2-methoxyethane --.
Line 56, "LiC$_6$F$_{so3}$" should be -- LiC$_6$F$_5$SO$_3$ --.

Column 15,
Line 28, "R$^1$" should be -- R$^4$ --.

Signed and Sealed this

Nineteenth Day of March, 2002

*Attest:*

JAMES E. ROGAN
*Director of the United States Patent and Trademark Office*

*Attesting Officer*